2,742,359

PROTEIN FROM AERATED SEWAGE AND WHEY

Otto Rahn, Lincoln, Nebr., assignor of one-half to Robert V. Morse, Ithaca, N. Y.

No Drawing. Application May 27, 1952,
Serial No. 290,335

5 Claims. (Cl. 99—2)

This invention relates to the manufacture of a nutritious food suitable for animals, using waste materials for which there is at present little or no market. In general the purpose is to accelerate the rotation of elements in nature, by utilizing as food a crop of minute bacterial plants rich in protein which can be grown in a few hours instead of passing them into fertilizer for ordinary farm crops which take months before they can be fed to stock. In particular the invention seeks to use activated sewage sludge (the aerated so-called "settled sewage" of modern sewage disposal systems) which is a waste product difficult to dispose of in the past. This invention also utilizes another waste product—the whey from cheese factories—to help sterilize the protein bearing bacterial plants after they have grown and to also kill any harmful bacteria such as anthrax. Whey is a waste product of the cheese factories which by law they are not allowed to run into creeks, as it would cause a great nuisance. It is rich in milk sugar but so low in protein that it is not a balanced feed. The bacterial plants here used are just the opposite—rich in protein but no sugar. Under the present invention, following a process to be described, blends of the two can make a satisfactory feed for livestock.

In the activated sludge process of sewage disposal which is in use in many modern cities, the sewage is first screened to remove paper and any other large insoluble matter and then goes through a long settling tank where the insoluble matter settles out. This sewage sludge can be used only as fertilizer.

The effluent from the primary settling tank is the so-called "settled sewage" (meaning the sewage after the insoluble matter has settled out). This is a slightly cloudy fluid and contains all the soluble matter in the sewage. It flows from the first settling tank into another large tank (really a pond) where it is aerated. Large volumes of air are blown thru the sewage by perforated tubes, and this great surplus of air starts the rapid growth of a special kind of bacteria which oxidize the organic matter of the sewage and which thereby obtain energy for growth while at the same time purifying the sewage. These bacteria grow to such enormous numbers that all organic matter is decomposed in a few hours. The sewage becomes quite purified except for the bacteria themselves. This aerated activated sewage flows into large settling ponds, where the bacteria settle out and the purified sewage runs off, having become quite harmless by the complete removal of organic matter. The effluent can be run into a creek or river without danger of causing bad odors or of killing fish.

It is important to remember that there are two settling processes: first, the raw sewage is settled to remove all insoluble matter; that sediment is called "sewage sludge" and is not useable for anything but fertilizer. The remaining fluid, called "settled sewage," is then aerated so that bacteria grow at the expense of the dissolved organic matter which thereby becomes insoluble, being changed to bacteria. The bacteria must also be removed. In the usual process this is again done by settling, but in quite separate tanks so that the bacteria do not become mixed with the sewage sludge from the raw sewage.

This mass of settled bacteria has been quite a nuisance, because they accumulate in large quantities and must be disposed of. They consist largely of bacterial protein. If this protein rots, it stinks terribly. The common method of disposal has been quite complicated. The usual method has been to let them putrefy in a closed tank; this produced gas which was combustible and could be used to run the engines of the sewage plant. What remained was an odorless mass that was spread on sand to dry in special glass houses. The dried product could be used as fertilizer.

Instead of the usual steps mentioned in the preceding paragraph, the present invention picks up the bacterial protein before it rots and develops it into an animal food instead of into fertilizer. The mass of bacteria, after aeration, is not worthless. Dry bacteria consist of at least 50% protein, and this protein is easily digestible. It seems therefore, uneconomical to use an expensive method for disposing of protein which is the most valuable of all food constituents. It should be possible to use this enormous quantity of protein as animal feed.

The mass of bacteria that develops on aeration of the settled sewage fluid is really a source of valuable protein if it can be changed to a better form. That is possible under the present invention by a series of steps making use of another waste food product, whey, together with heat and acid sterilization and certain mechanical steps including centrifuging of the aerated sewage before it reaches the whey and subsequent drum drying.

A centrifuge is used in the present invention for concentrating the developed bacteria because it is much more rapid than settling. This machine is very similar to the types of centrifuge developed to separate bread yeast from the malt extract in which it is cultivated. Such machines have two spouts; out of one comes the pure liquid, free from yeast, while the other delivers the yeast in so concentrated a suspension that it can be run directly into filter presses.

In the present invention, after the bacteria developed in the aerated settled sewage has been concentrated, all the bacteria must be killed, if they are to serve as food for animals. In order to do that, whey is used in a sour or acid condition. Whey is a surplus by-product readily obtainable, usually in the form of whey powder. The whey from cheese factories is dried because the cheese factories are not allowed to run the whey into creeks; so the cheese factories are anxious to have an outlet for dried whey.

The whey, if in the dried form, can be re-established by adding water to the powder. In the present invention it is desired to have the whey in an acid condition, so it is permitted to sour for say half a day. The souring can be hastened by adding a pure culture. The acid whey is then added to the concentrated bacteria from the aerated settled sewage and the mixture heated to a temperature near boiling. That is necessary because sewage may contain pathogens such as anthrax bacteria. Heating in acid is sure to kill even the very heat resistant spores of bacteria.

The proportions of acid whey and bacteria concentrate may vary widely according to the nutritional results desired. The sterilization should be regularly checked by bacteriological analysis to make sure that the heating in the acid medium has been sufficiently prolonged to make the product safe. The degree may vary in different installations as will be apparent to the bacteriological engineer, and in large masses allowance should be made for the time of penetration. The techniques of sterilization are well known in the canning industry, where bacteria are killed in acid mediums at ordinary boiling temperature and where higher temperatures are used when acid is weak or not present. Since all sorts of bacteria may be present in ordinary food before canning, the same general principles of sterilization procedure apply here as in ordinary food canning.

After sterilization, this heated mixture of dead bacteria and whey is then dried to a powder on a drum drier—a relatively cheap machine such as used for the lower grades of milk powder. The drum, heated by steam under pressure on the inside, rotates slowly. The liquid to be dried flows in a thin film onto the top of the hot drum, and drying is so quick that the dry material is scraped off at the bottom. A half turn is sufficient to evaporate all moisture.

The dry material, in our case a mixture of dead bacteria and whey solids, is ground to a powder and may be put in bags and shipped away as animal feed. It also may be compressed into pellets or other forms in a manner similar to dog biscuits. Its composition may be varied within wide limits. The basic product, while nutritious, has one considerable disadvantage, namely the black color of the dried bacteria. It may be desirable to mix it with other food products of a more attractive appearance such as corn, wheat or rice; and of course minerals, flavors and spices can also be added. Many animals like sour milk, and so the whey flavor is not objectionable to them.

The final effluent from a sewage disposal system, after it has been freed from bacteria and all organic matter by this process, still contains a good deal of the mineral matter of sewage such as potassium, phosphates and nitrates, completely oxidized, i. e., in mineral form which is the normal form for plant food. This final effluent can be allowed to safely run into creeks without any danger, or be used to fertilize soil. Because it is in quite diluted form it may also be used to grow water plants of commercial value, thus returning all the materials to the cycle of nature in a useful manner.

In the foregoing invention the protein bearing bacteria, being heavier than water, can be separated by allowing them to settle after aeration; but in order to save time and obtain a higher concentration it is generally desirable to centrifuge them. Also, when cheese factories are near to the sewage disposal plant, whey may be delivered into the process in a liquid form. However, dried whey is the usual commercial form and it is cheap, so that it is generally desirable to buy it in the dried form and reconstitute it by adding water before introducing it into the protein bearing bacteria as described. The resulting dried food product is preferably ground to a powder before being used for food; but cutters or scrapers can be used on the drying drum which will shave it off in bits small enough for use by some animals without grinding. Spray drying can also be used.

While I have in the foregoing described a preferred form, it will be understood that it is for purposes of illustration to make clear the principles of the invention, which is susceptible to various modifications and adaptations in different installations as will be apparent to those skilled in the art without departing from the scope of the invention as stated in the following claims.

I claim:

1. A protein food product comprising a dried mixture of sterilized protein bearing dead bacteria from aerated settled sewage combined with whey solids forming a compacted mass in solid form, the mixture having been sterilized in an acid condition induced by whey in a liquid condition prior to drying, the whey supplying milk sugar to supplement the protein of the dead bacteria to produce a more balanced food.

2. A process for making a protein food product which consists in taking protein bearing live bacteria from aerated settled sewage, adding soured whey and heating in an acid condition to kill the bacteria, and drying the mixture of dead bacteria and whey, the whey supplying milk sugar to supplement the protein of the dead bacteria to produce a more balanced food in solid form comprised principally of dead protein bearing bacteria and dried whey.

3. A process for making a protein food product which consists in taking protein bearing live bacteria from aerated settled sewage, centrifuging the bacteria to concentrate the same, adding soured whey to the concentrated bacteria and heating in an acid condition to kill the bacteria, and drying the mixture of dead bacteria and whey, the whey supplying milk sugar to supplement the protein of the dead bacteria to produce a more balanced food in solid form comprised principally of dead protein bearing bacteria and dried whey.

4. A process for making a protein food product which consists in taking protein bearing live bacteria from aerated settled sewage, centrifuging the bacteria to concentrate the same, adding soured whey to the concentrated bacteria and heating in an acid condition to kill the bacteria, drying the mixture of dead bacteria and whey to a solid form, and grinding the dried mixture of dead bacteria and whey solids, the whey supplying milk sugar to supplement the protein of the dead bacteria to produce a more balanced food and pressing the dried mixture to form compacted masses in solid form.

5. A process for making a protein food product which consists in taking protein bearing live bacteria from aerated settled sewage, centrifuging the bacteria to concentrate the same, taking dried whey, reconstituting it by adding water, souring it, and adding the soured whey to the concentrated bacteria, heating in an acid condition to kill the bacteria, and drying the mixture of dead bacteria and whey, the whey supplying milk sugar to supplement the protein of the dead bacteria to produce a more balanced food in solid form comprised principally of dead protein bearing bacteria and dried whey.

References Cited in the file of this patent

UNITED STATES PATENTS

| | | |
|---|---|---|
| 2,124,820 | Hellinger | July 26, 1938 |
| 2,328,361 | Sanders | Aug. 31, 1943 |
| 2,608,483 | Hayes | Aug. 26, 1952 |
| 2,646,386 | Miner et al. | July 21, 1953 |

OTHER REFERENCES

Annual Report of Dept. of Agriculture Exp. Sta., University of Wisconsin, Bulletin 466, May 1945, pages 52 and 53; also Bulletin 469, May 1946, page 61.